United States Patent [19]

Goldhammer

[11] 4,157,671
[45] Jun. 12, 1979

[54] DRIVE FOR CUTTING ROLLERS OF PAPER SHREDDING OR CUTTING APPARATUS

[76] Inventor: Albert Goldhammer, Zum Hecht 46, 7773 Nussdorf, Fed. Rep. of Germany

[21] Appl. No.: 893,871

[22] Filed: Apr. 6, 1978

Related U.S. Application Data

[63] Continuation-in-part of Ser. No. 665,959, Mar. 11, 1976, abandoned.

[51] Int. Cl.² .................. B23D 19/04; B26D 1/24; H02P 7/74
[52] U.S. Cl. .................................. 83/492; 83/345; 83/425.3; 318/98; 318/112
[58] Field of Search ............... 83/11, 12, 345, 492, 83/493, 501, 425.2, 425.3, 425.4, 513, 516, 344; 318/98, 99, 112

[56] References Cited

U.S. PATENT DOCUMENTS

| 1,907,596 | 5/1933 | Shirk ........................ 318/99 X |
| 2,086,476 | 7/1937 | Quick et al. .................... 83/492 |

Primary Examiner—Willie G. Abercrombie
Attorney, Agent, or Firm—Albert L. Jeffers; Robert G. Irish

[57] ABSTRACT

A drive for paper shredding or cutting apparatus having two counter-rotating cutting rollers each carrying a plurality of cutting knives, the knives of each roller being in engagement. Each roller is independently driven by an induction motor through a direct gear drive.

6 Claims, 2 Drawing Figures

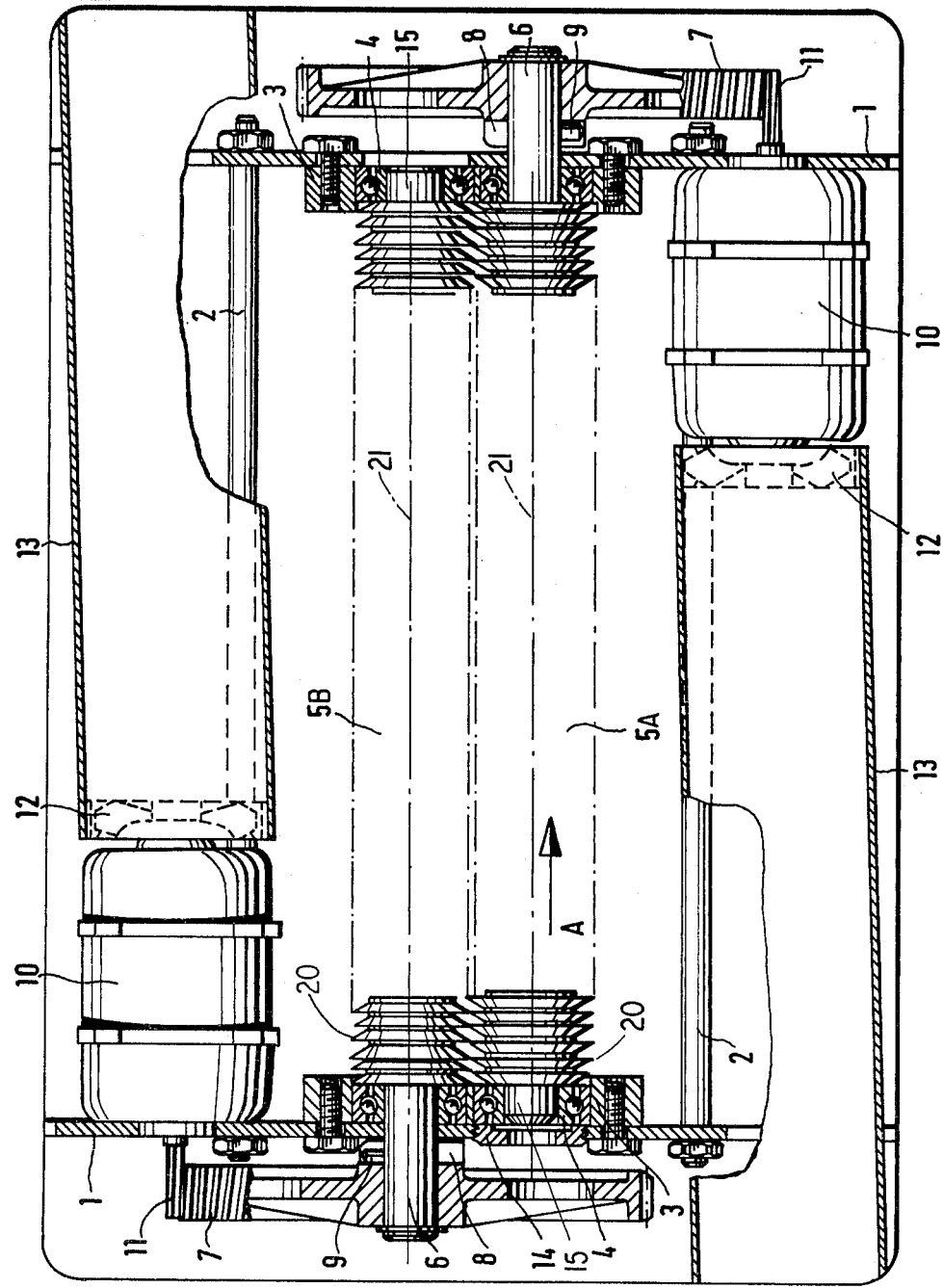

DRIVE FOR CUTTING ROLLERS OF PAPER SHREDDING OR CUTTING APPARATUS

This application is a continuation-in-part of application Ser. No. 665,959, now abandoned.

BACKGROUND OF THE INVENTION

1. Field of the Invention

This invention relates to a drive for two counter-rotating cutting rollers of a paper shredding or cutting apparatus, and more particularly to such an apparatus in which each roller is independently gear-driven by an induction motor.

2. Description of the Prior Art

A drive for two counter-rotating cutting rollers is described in German Patent Specification No. 1.810.622. That drive has been satisfactory because it combines a high degree of efficiency with a compact construction in which one motor drives both cutting rollers, the motor having gear teeth on its shaft which mesh with a helical gear on one end of the shaft of one of the cutting rollers, the second cutting roller being driven by a gear on its shaft which meshes with a gear on the other end of the shaft of the first cutting roller. The drive of the second cutting roller through the two gears meshing with one another, however, still uses excessive energy.

BRIEF SUMMARY OF THE INVENTION

The present invention is therefore addressed to the problem of improving the drive disclosed in said German Patent Specification so that it uses less energy and can be manufactured still more economicaly. This is accomplished according to the invention by providing two single phase induction motors, identical to one another, each driving one of the cutting rollers through a gear drive.

It has been found, that the use of two identical single phase induction motors for the drive of the two cutting rollers is less expensive than the single, larger induction motor of the prior drive. For example, with the drive according to the present invention, two induction motors, each of 150 watts, are used which achieve the same cutting output as a substantially more expensive induction motor of 500 watts with the prior drive. The two gears driving one cutting roller from the other in the prior drive are thus eliminated.

There are several possibilities known in the art for the two gear trains which respectively drive the two cutting rollers. Preferred, however, is the construction of the above-mentioned prior drive in which each motor shaft has involute teeth thereon which mesh with a helical gear on the shaft of the respective cutting roller. For details of this preferred embodiment of the gear trains, reference is made to the said German Patent Specification and the following description of the preferred embodiment.

Further, it has been found that both single phase induction motors can use a common starting and running condenser, whereby further costs are saved. Further, one condenser has less wattless current than two condensers and occupies less space.

Still further, in the preferred embodiment, one of the cutting rollers is adjustable in an axial direction with respect to the other cutting roller for adjustment of the cutting knives.

With the new drive, it has further been found, surprisingly, that with the independent drive of each cutting roller at the same speed, an equal distribution of the loads of both driving motors is obtained, the load on both cutting rollers being effected in operation by the materials cut-up or torn therebetween.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 shows a diagrammatic and partially broken away elevation of a drive according to the present invention.

DESCRIPTION OF THE PREFERRED EMBODIMENT

Figure 1:
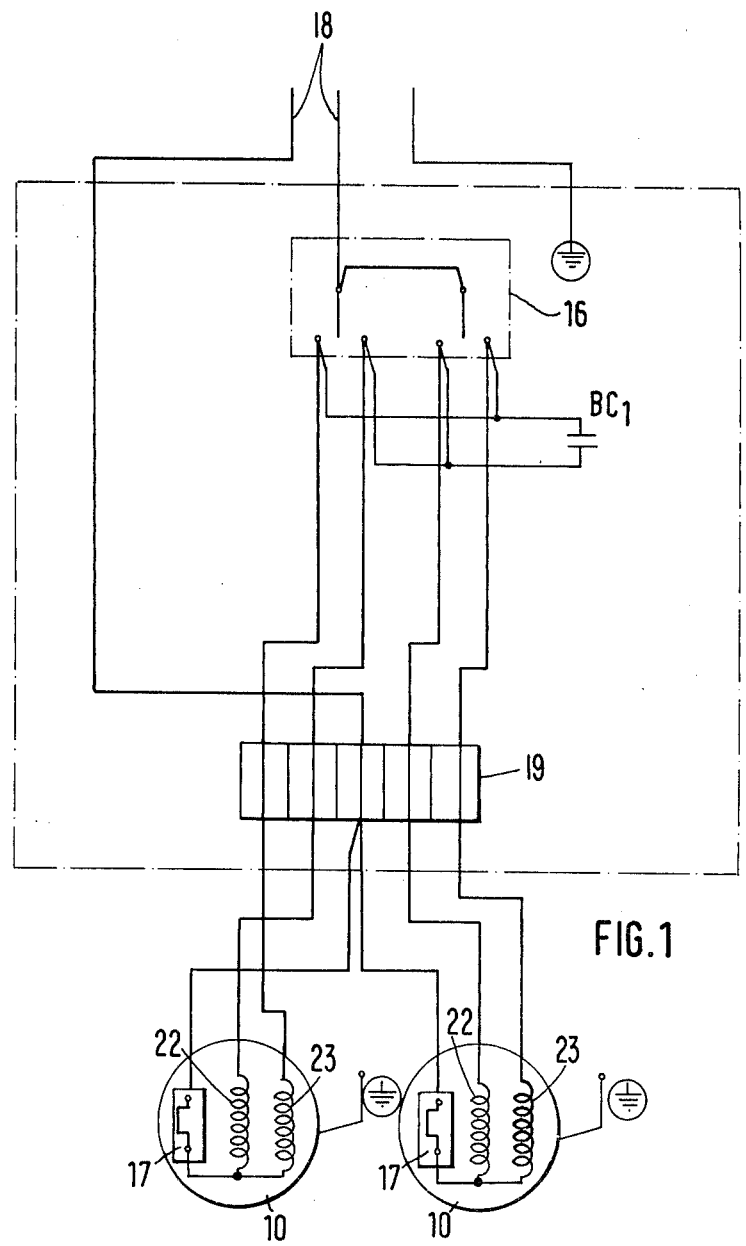
FIG. 1 shows a circuit diagram of the two driving motors.

Referring now to FIG. 1, two, reversible, single phase, permanent-split capacitor, squirrel cage, induction motors 10 are shown adapted to be connected in parallel to single phase, alternating current supply line 18 by connector block 19 and reversing switch 16. Phase splitting capacitor $BC_1$ is connected to be common to the two motors 10, as shown. Each motor 10 includes a two phase field winding 22, 23 and a conventional thermal overload 17 which may be connected as shown. Induction motors 10 are substantially identical with substantially identical speed-torque characteristics. While the permanent-split capacitor type of motors using a common capacitor are preferred, it will be understood that other types of induction motors may be employed so long as they have suitable speed-torque characteristics.

FIG. 2 shows the essential construction details of the drive. Two identical frame plates 1 are firmly connected to one another, as a mirror image, by means of spacers 2. On each plate 1 there is secured a bearing support 3 in which are located bearings 4 for shaft ends 6, 15, of cutting rollers 5A and 5B having cutting knives 20 respectively in engagement as shown. On one shaft end 6 of each of the cutting rollers 5 there is mounted a driving gear 7 which is secured to the respective shaft end by a clamp 8 and a catch 9. The cutting rollers 5 are driven in counter-rotating directions by gears 7 which are respectively driven by the motors 10 by means of pinions 11. The pinions 11 have involute teeth with at least eight teeth, while gears 7 have helical teeth thereon. The motors 10 are provided with fans 12 which draw in cold air through the gears and through the motor bodies, the heated air being expelled through the tubes 13.

All constructional parts described thus far are in pairs, and are identical to one another.

With the aid of an annular nut 14, one of the cutting rollers 5A is axially adjustable in the direction of the arrow "A" against the other cutting roller 5B to provide an adjustment of the cutting knives 20. It will be noted that rollers 5 are mounted on frame plates 1 for rotation about spaced, parallel, fixed axes 21.

In the foregoing, while cutting rollers 5 have been mentioned, the drive described may, however, also be employed with shredding rollers in which the cutting knives of the cutting rollers described are replaced by known shredding arrangements.

As noted, a common condenser $BC_1$ provides the requisite phase shift for one field winding of both induction motors 10 which are of the reversible, permanent-split capacitor type. The voltage on the condenser remains constant in all measurements, and no pendulum or oscillating phenomena occur. The common condenser may be selected according to the torque required of the two motors.

Measurements have shown that the loading is distributed uniformly on the two motors and loading differences are compensated extremely rapidly. During normal operation, with the material being cut by rollers 5 applying equal loads to the two motors 10, the motors and cutting rollers operate at the same speed. However, if the two cutting rollers are unevenly loaded, as for example by a small piece of metal or a thick piece of paper becoming wedged between the rollers such that a high load is applied to one roller and its driving motor tending to stall it, the other roller may still rotate relatively freely. In such an extreme case of loading, it has been found that at the instant when the pull-out torque of the overloaded motor tends to be exceeded, the full torque of the other motor is still available to relieve the overload on the first motor and thus, the torque of the other motor increases to equalize the loading so that the jamming is released in spasmodic fashion.

It will be seen that in accordance with the invention, each of the two motors drives a separate cutting roller; the two rollers, while in engagement with each other, are mechanically, completely separate from each other and are driven at the same speed only when material is being continuously cut.

While there have been described above the principles of this invention in connection with specific apparatus, it is to be clearly understood that this description is made only by way of example and not as a limitation to the scope of the invention.

What is claimed is:

1. In a drive for a paper cutting or shredding mechanism including two counter-rotating cutting rollers respectively having cutting knives thereon in cutting engagement with each other, said rollers being mounted in a frame for rotation about spaced, parallel, fixed axes, the improvement comprising: two alternating current motors coupled in parallel across a source of alternating current, said motors having substantially identical speed-torque characteristics, and gearing means drivingly connecting each motor to a respective roller for independently driving the same whereby an overload condition on one roller and its respective motor results in equalizing the load between both motors.

2. The drive of claim 1 wherein said motors are induction motors.

3. The drive of claim 2 wherein said source is single phase, and said motors are of the single phase type.

4. The drive of claim 3 wherein each of said motors has a two phase field winding, and further comprising a single capacitor, and means for coupling said capacitor in series with one phase of the field winding of each motor thereby to provide a permanent-split capacitor motor.

5. The drive of claim 4 wherein said coupling means includes a reversing switch.

6. The drive of claim 1 further comprising means for relatively moving said rollers axially thereby to adjust said cutting knives.

* * * * *